United States Patent [19]

Peterson et al.

[11] Patent Number: 5,487,774
[45] Date of Patent: Jan. 30, 1996

[54] GAS PHASE FRACTIONATION METHOD USING POROUS CERAMIC MEMBRANE

[75] Inventors: Reid A. Peterson; Charles G. Hill, Jr.; Marc A. Anderson, all of Madison, Wis.

[73] Assignee: Wisconsin Alumni Research Foundation, Madison, Wis.

[21] Appl. No.: 148,714

[22] Filed: Nov. 8, 1993

[51] Int. Cl.⁶ .................................................. B01D 53/22
[52] U.S. Cl. ........................................ 95/45; 95/50; 96/11
[58] Field of Search ............................. 95/45, 47, 53–56, 95/50; 96/4, 11

[56] References Cited

U.S. PATENT DOCUMENTS

| | | |
|---|---|---|
| 2,627,933 | 6/1947 | Teter . |
| 3,940,912 | 3/1976 | Buchner .................................. 55/16 |
| 4,151,060 | 4/1979 | Isenberg ............................. 204/195 S |
| 4,158,621 | 6/1979 | Swift et al. ............................. 208/114 |
| 4,482,360 | 11/1984 | Taketomo et al. ........................ 95/53 |
| 4,483,694 | 11/1984 | Takamura et al. ....................... 55/158 |
| 4,689,150 | 8/1987 | Abe et al. ............................. 96/11 X |
| 4,888,033 | 12/1989 | Charpin et al. ......................... 55/158 |
| 4,902,307 | 2/1990 | Gavalas et al. .......................... 55/16 |
| 5,006,248 | 4/1991 | Anderson et al. .................. 210/500.25 |
| 5,069,794 | 12/1991 | Haag et al. ............................ 210/650 |
| 5,096,745 | 3/1992 | Anderson et al. ....................... 427/226 |
| 5,104,539 | 4/1992 | Anderson et al. .................. 210/500.25 |
| 5,108,465 | 4/1992 | Bauer et al. ............................ 55/16 |
| 5,110,478 | 5/1992 | Haag et al. ............................ 210/650 |
| 5,139,540 | 8/1992 | Najjar et al. ............................ 55/16 |
| 5,139,541 | 8/1992 | Edlund ................................. 55/16 |
| 5,160,352 | 11/1992 | Najjar et al. ............................ 55/16 |
| 5,160,713 | 11/1992 | Mazanec et al. ....................... 423/210 |
| 5,162,301 | 11/1992 | Reich et al. ............................ 505/1 |
| 5,171,449 | 12/1992 | Pasternak et al. ...................... 210/640 |
| 5,183,482 | 2/1993 | Najjar et al. ............................ 55/16 |
| 5,196,380 | 3/1993 | Shadman ................................ 502/4 |
| 5,269,926 | 12/1993 | Webster et al. .................... 210/500.25 |
| 5,310,414 | 5/1994 | Najjar et al. ............................ 95/45 |

FOREIGN PATENT DOCUMENTS

| | | |
|---|---|---|
| 0362898 | 4/1990 | European Pat. Off. ................. 55/16 |
| 0458217 | 11/1991 | European Pat. Off. ................. 55/16 |
| 2177881 | 11/1973 | France ................................ 55/16 |
| 3918190 | 6/1990 | Germany ............................. 55/16 |
| 53-099078 | 8/1978 | Japan ................................. 95/55 |
| 55-119420 | 9/1980 | Japan ................................. 95/55 |
| 57-207533 | 6/1981 | Japan . |
| 59-177117 | 3/1983 | Japan . |
| 61-209005 | 9/1986 | Japan ................................ 96/11 |
| 604826 | 12/1975 | Switzerland .......................... 55/16 |
| WO89/00983 | 2/1989 | WIPO . |

OTHER PUBLICATIONS

Anderson, et al., "Titania and Alumina Ceramic Membranes," *Journal of Membrane Science*, 39:243–358 (1988).
Asaeda and Du, "Separation of Alcohol/Water Gaseous Mixtures by Thin Ceramic Membrane," *Journal of Chemical Engineering of Japan*, 19:72–77 (1986).

*Primary Examiner*—Robert Spitzer

[57] ABSTRACT

Flaw-free porous ceramic membranes fabricated from metal sols and coated onto a porous support are advantageously used in gas phase fractionation methods. Mean pore diameters of less than 40 Å, preferably 5–20 Å and most preferably about 15 Å, are permeable at lower pressures than existing membranes. Condensation of gases in small pores and non-Knudsen membrane transport mechanisms are employed to facilitate and increase membrane permeability and permselectivity.

19 Claims, 5 Drawing Sheets

GAS PHASE FRACTIONATION METHOD USING POROUS CERAMIC MEMBRANE

STATEMENT REGARDING FEDERALLY SPONSORED RESEARCH

This invention was made with U.S. government support awarded by DOE Grant #DOE DE-AC07-86ID12626 and EPA Grant #RA 817115-01-0.

FIELD OF THE INVENTION

The present invention relates to methods for fractionating mixtures of gases and, in particular, to methods in which the mole fractions of individual gases are increased by passing a gaseous mixture over a porous membrane across which a pressure differential exists.

BACKGROUND OF THE INVENTION

Porous ceramic membranes are most frequently used to fractionate or concentrate liquid solutions. However, their utility in gas phase separations has not been adequately explored although early ceramic membranes were used to process isotopic forms of volatile uranium hexafluoride for use in nuclear weapons and nuclear fuels. In the past ten years, new ceramic membranes have been developed which have improved permselectivity characteristics. The most useful of these membranes have been fabricated from γ-alumina via the sol-gel process. For example, alumina porous particulate ceramic membranes having typical pore diameters of about 40–50 Å were described by Ulhorn for gaseous separation. However, these existing porous ceramic membranes have been unable to adequately discriminate among gaseous species, except when employed at very high pressures. In general, existing ceramic membranes exhibit only moderate gas phase permselectivities. What is desired is a gas phase separation method that offers improved permselectivity over existing porous ceramic membranes.

Porous ceramic membranes have many properties which make them especially appealing for use in gas phase separations. Of particular interest is their stability under a wide range of conditions including high and low temperatures, oxidizing and reducing atmospheres, and the presence of organic solvents such as benzene, toluene, or hexane. Their stability makes these membranes appropriate for use in a variety of applications which have not previously been feasible because of the limitations of commercially available polymeric membrane systems, which provide a physical barrier through which permeation is thought to occur by adsorption or dissolution, diffusion, and desorption steps.

There are four basic mechanisms by which permselective transport through a porous material can take place. These mechanisms are viscous flow, Knudsen diffusion, molecular sieving and surface diffusion. The relative importance of each mechanism in transport depends upon the surface characteristics of the membrane and on the relative contributions of every other transport mechanism. Viscous flow dominates the transport process when the membrane pore diameters are relatively large, for example greater than $0.1\mu$. A transition from viscous flow to Knudsen diffusion takes place when the mean diameter of the pores approaches $0.1\mu$. The transition from Knudsen diffusion to molecular sieving occurs when molecules larger than the pores are physically excluded from entering the membrane. Thus, the onset of molecular sieving depends upon the size of the gas molecules being transported. This transition typically takes place when the pore diameter approaches 5 Å. At present, however, it is not clear when surface diffusion is an important transport mechanism, nor when transport shifts from a Knudsen mechanism to a surface diffusion driven mechanism.

For particulate ceramic membranes, the transport process is usually viewed in terms of direct passage of molecules through the 10–100 nm void regions constituting the pores which form continuous paths through the membrane. This view of ceramic membranes usually requires that the primary mechanism of gas phase separations be Knudsen diffusion. It should be noted that while the transport occurs via physically real pores in the membrane, these pores are seldom cylindrical in shape, but are usually irregular and often form tortuous paths.

The permeability of a gas transported through a porous membrane by Knudsen diffusion may be expressed as $$P_m = 2\epsilon\mu_k \nu r / 3RTL \tag{1}$$

where $\epsilon$ is the porosity of the solid, $\mu_k$ is a shape factor for Knudsen diffusion, r is the mean radius of the pores in the material, R is the gas constant, T is the absolute temperature, L is the thickness of the membrane and $\nu$ is the mean molecular speed given by $$\nu = (8RT/\pi M)^{1/2} \tag{2}$$

where M is the molecular weight of the permeating molecule. Consideration of these equations makes it apparent that, since the permeability of a porous ceramic membrane is independent of pressure, the Knudsen diffusivity is also independent of pressure.

SUMMARY OF THE INVENTION

The present invention is summarized in that porous ceramic membranes having a mean pore diameter of less than 40 Å may be advantageously used in a method for fractionating gases in a mixture. The permeability of these membranes to gases is pressure dependent which, therefore, suggests that Knudsen diffusion is not the sole transport mechanism. In certain cases, the small pore size of the membranes also promotes condensation of particular gases at relatively low pressures, thereby further enhancing their advantageous use.

It is an object of the present invention to provide a method that permits fractionation of gaseous mixtures at lower pressures than are now required.

It is an advantage of the present invention that lower inlet pressures are required because the permselectivity of the membrane used in the method is very high.

DETAILED DESCRIPTION OF THE PREFERRED EMBODIMENT

Figure 1:
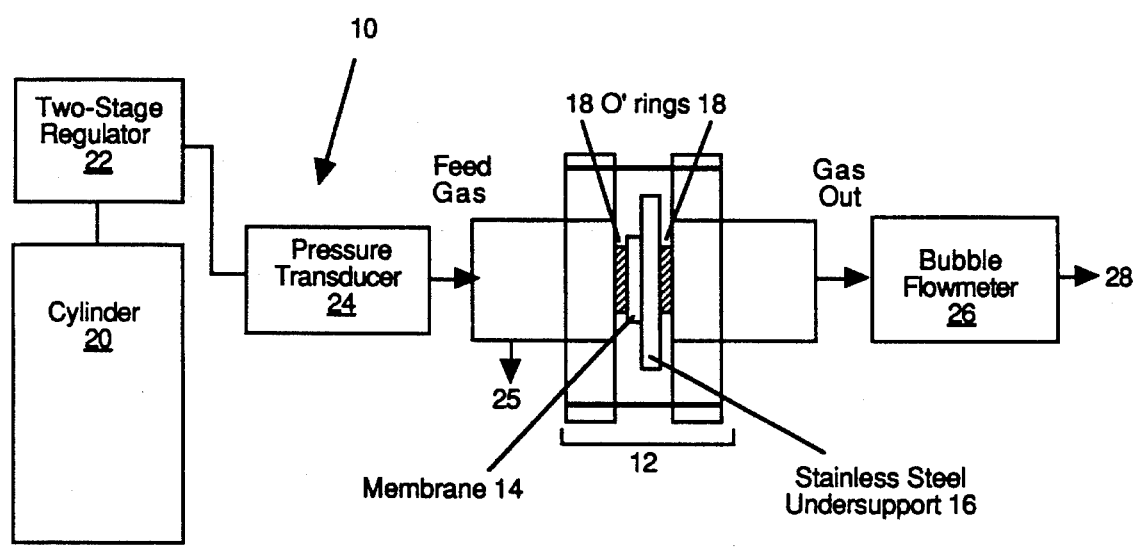
FIG. 1 shows a schematic view of an apparatus for practicing the method of the present invention.

In this application, a porous ceramic membrane is a metal membrane having narrowly distributed pore diameters of less than 40 Å. The metal may be any transition metal except aluminum or silicon and is preferably titanium. The term "metal" is also intended to also include metal oxides of the transition metals, such as titania. Ceramic refers to the heating of a membrane to a temperature high enough to fuse adjacent particles to one another but not so high as to eliminate the desired membrane porosity. Surface activity refers to an affinity of a gas for the porous membrane surface, such activity may arise by adsorption of the gas to the surface by condensation of the gas in the pores, by transport through the pores or by other mechanisms.

The method for fractionating a mixture of gases disclosed herein utilizes a porous ceramic membrane having mean pore diameters of less than 40 Å and preferably of 5–20 Å, most preferably 15 Å. When such a membrane is used in the method, the permeability of the membrane and its permselectivity for transport of particular components of the gaseous mixture are much higher than can be achieved using existing membranes.

The fractionation method includes the steps of passing the mixture of gases having distinct surface activities over the membrane described at an average input pressure above 850 Torr absolute, preferentially adsorbing the most surface-active gas within the membrane pores. Of course, it is not essential that fractionation be complete, nor that any gas pass completely through the membrane, although this may be desirable. All that is required is that the method permit the selective depletion, to acceptable levels, of one or more undesired gases from a feed stream and the corresponding enrichment in the retentate stream of the remaining gases.

The method allows collection of gas that has permeated the membrane as well as of the retentate stream from which one or more gases have been depleted after flowing over the membrane.

The method for fractionating individual gases from a mixture of gases takes advantage of the fact that each gas in a mixture has a definable permselectivity in a porous ceramic membrane. It is believed by the inventors that the advantageous use of a porous ceramic membrane in the method results from the desirable deposition and transport of gases by the membrane. In particular, surface activities including capillary condensation and surface diffusion are thought to enhance the ability of porous ceramic membranes to preferentially transport certain gases through the membrane, when compared against polymeric membranes. It is apparent that non-Knudsen transport mechanisms are important in the membrane used in the method since there exists a dependence of permeability upon pressure. Pressure dependence would not be expected if Knudsen diffusion alone was responsible for the transport.

One example of such porous ceramic membranes has been previously described in U.S. Pat. No. 5,104,539 (Anderson et al.), which is incorporated herein by reference. U.S. Pat. No. 5,104,539 also disclosed a suitable method for making such membranes.

In general, the method for making suitable membranes for use in the method begins with the creation of a metal alkoxide in which the alkoxy moiety in the metal alkoxide is a large, relatively complex, organic alkoxy. It has been typical in prior art methods to utilize the commercially available forms of metal alkoxides. For example, one convenient titanium alkoxide commercially available (Aldrich) is titanium tetra-isopropoxide ($Ti(Opr^i)_4$). Substitution of the alkoxide moiety in the beginning titanium alkoxide, by substituting a 2-methyl-2-butoxy group for an isopropoxy group, facilitates the creation of small particles in the sol and therefore smaller pore sizes in the resultant titanium dioxide ceramic membrane. A similar result has been demonstrated for zirconium dioxide as well. Since the phenomenon appears attributable to the relatively large physical size of the alkoxy moiety, it would appear that the phenomenon attributable to the creation of the small particle sizes is the effect of the large alkoxy moiety in controlling the rate of the reaction leading to the creation of metal oxides in the solution by interfering with access to the titanium atom. Accordingly, other large organic alkoxy groups, particularly those with branched shapes and having at least four or five carbons, would result in similar control of the reaction rate, and result in the ability to achieve small particle sizes and small pore sizes in the membrane.

Since neither titanium nor zirconium tetra-2-methyl-2-butoxide is known to be commercially available at present, they must be created from readily available materials. One convenient method for creating titanium or zirconium tetra-2-methyl-2-butoxide is by an alcohol exchange method, using the precursor commercially available tetra-isopropoxide. This is done by reacting the titanium (or zirconium) tetra-isopropoxide with tertamyl alcohol in a benzene solvent to yield titanium tetra-2-methyl-2-butoxide and isopropanol. Then by distillation, isopropanol can be removed with the benzene as an azeotrope, and then excess tert-amyl-alcohol and benzene can be removed by distillation.

Once the metal tetra-2-methyl-2-butoxide is available, the reaction may proceed. The metal alkoxide and a small amount of water are separately dissolved in equal amounts of alcohol, with the alcohol preferably being the same organic alcohol corresponding to the alkoxy group in the metal alkoxide. Three other critical parameters appear to be the molar concentration of metal ions in the ultimate solution, the molar ratio of water molecules to metal atoms, and the pH of the water. These three parameters are interdependent. Thus for a molarity of metal atoms of 0.05 molar, the ratio of water molecules in the range of 1 to 7 to achieve desirable membranes. However, for higher metal concentrations, i.e. a molarity of titanium of 0.1 molar, then a ratio of water molecules (pH=2) to metal atoms should not exceed about 3 before the reaction ceases to function effectively. The pH of the water is another factor which affects the particle size formed in the sol since the protons act as a catalyst for the hydrolysis reactions. Values of pH in the range of about one to three are preferred, with a lower pH generally resulting in a smaller particle size. If the ratio of water molecules to metal atoms is too high, or if the molarity of the metal atoms becomes too high, the creation of metal oxides becomes prevalent in the solution and precipitation results. This phenomenon yields particles of a size higher than is desired in creating the membrane here. However, by limiting the molarity of the metal atoms and the ratio of water to metal, and by adjusting the pH of the water, the size of the particles can be strictly limited in a way that results in efficient creation of finely porous membranes.

Again, the procedure begins with the dissolving of the titanium or other metal alkoxide and water in separate amounts of the alcohol. The two solutions are then mixed together by dropping the water alcohol part into the alkoxide alcohol part. The transparent solution resulting is preferably stirred while the reaction continues. This step may require some time since the rate of the reaction leading to formation of metal oxides has been impeded deliberately in order to prevent the creation of large particles. The result is a transparent sol containing very small suspended oxide particles.

The precursor sols can be tested for the particle size by quasi-elastic light scattering techniques. Using such a technique it has been found that the particles in the sol have a diameter which can be varied down to less than 5 nanometers. Sols having nanometer size particles are referred to as nanoparticulate sols. The use of transmission electron microscopic imaging of the dried gel has revealed that the dried gel is composed of quantum sized particles having a characteristic dimension of less than 3 nanometers. BET measurements of the resulting membrane fired to 250° C. have indicated that membranes can have a mean pore diameter as small as 14 Angstroms with an extremely narrow distribution of pore sizes. The BET results also indicate that large surface areas and high porosities can be achieved in such a membrane. The measured surface areas of such membranes have varied from about 15 to over 200 square meters per gram of material and the porosities measured have been generally over 30% and have been as high as 39–50%. By altering the ratio of water to metal and by altering the molarity of the metal in the beginning solution, the size of the particles in the solution, and the resulting size of the pores in the membrane, can be controlled between 5 and 40 Angstroms in diameter in a relatively efficient manner. It has also been found that polymeric gelation is largely prevented by the steric effect of the large alkoxy group on polycondensation reactions. Particles of different size ranges, in the range of 2 nanometers (20 Angstroms) to 300 nanometers, can be harvested by quenching the particle growth at certain stages using polymeric stabilizing agents, such as polyethylene glycol and hydroxypropyl cellulose. In this fashion tailor-made membranes with desirable pore sizes throughout the range can be obtained by gelatinizing the corresponding particle sols. The lower range limit on the size of the pores in such a membrane is difficult to ascertain due to difficulties in measurement of the dimensions of the pores, but particles sized so as to give rise to pores as small as 5 Angstroms in diameter have been achieved. BET measurements were performed on unsupported titania membranes and, therefore, do not account for changes that may occur during membrane formation upon interaction of the sol with a support material. In many cases deposition of a sol upon a support material can retard particle growth during sintering, advantageously increasing the sintering temperature and allowing small holes to be maintained at higher temperatures.

To convert the resultant sol into a gel, the alcohol must be removed from the solution. The dried gels can then be fired in air at temperatures not to exceed 400° C. to sinter the gel into a particulate membrane.

To provide a solid support for the membranes thus formed, the sol may be deposited before gelation upon a porous or non-porous substrate. By providing a support, one increases the likelihood of forming a flaw-free membrane. A particularly useful support is a 0.02μ anodized alumina Anotec Anodisc. Various methods have been used to coat supports. These include slip-casting, dipping, spinning and spraying the support with the particulate suspension. Preferably, the support is pretreated with an ionic solution with a pH of less than 7, such as a 0.05 M phosphate solution, which reduces the overall positive charge on the support surface and readies the support to bind the positively charged particulate matter of the sol. The treated supports are next placed in an alcohol solution, such as the alcohol used during sol formation. In the method described above, the preferred alcohol is tertiary amyl alcohol. Immediately upon removal from the alcohol, the supports may be immersed in the sol for a short time. The supports are slowly removed from the sol and any excess sol is shaken from the surface of the supports. The supported membranes are allowed to dry in ambient air and are then fired to 200° C.–300° C. at a ramp rate of 1° C. per minute. The membranes are held at the firing temperature for 1 hour and then are cooled to ambient temperature at a ramp rate of 1° C. per minute. The membranes thus produced are essentially flaw-free.

For performing the gas phase fractionation method, an apparatus, such as that shown schematically at 10 in FIG. 1, is useful. Shown at the center of FIG. 1 is a membrane module 12 in which the supported membrane 14 is itself reinforced by a porous undersupport 16 made, for example, of stainless steel. The supported membrane 14 and its undersupport 16 are firmly secured between a pair of O-rings 18 to isolate the gas stream and the membrane 14 from the ambient atmosphere. The left side of FIG. 1 shows an inlet design in which a gas mixture passes from a cylinder 20 through a 2-stage regulator 22 and past a pressure transducer 24 into the membrane module 12. The regulator 22 is employed to control the pressure on the high pressure inlet side of the system. The inlet pressure is recorded via the pressure transducer 24. The retentate gas stream can pass from the fractionation apparatus 10 into a collection vessel or an analytical instrument, not shown, via an exit connection 25 from the inlet side. On the right, the outlet side includes a bubble flow meter 26 and an exit connection 28 to a downstream collection vessel or analytical instrument, not shown. The bubble flow meter 26 measures the effluent flow rate. From the flow rate, the permeability of the membrane to a particular gas may be determined by measuring the time required for a fixed volume of the gas at ambient conditions to pass through the membrane.

As noted above, viscous flow of gases cannot occur through membranes having mean pore diameters on the order of 15 Å. Moreover, the mean pore diameters of the membranes are too large to facilitate molecular sieve effects which typically require mean pore diameters of less than about 5 Å. Instead, the transport must occur via another mechanism. It was originally predicted, therefore, that Knudsen diffusion would be the primary transport mechanism by which gases move through the pore structure of the membrane. No surface activity was expected, given the small pore size and inert nature of the gases tested.

The present inventors herein report that transport of particular gases in the claimed method is pressure dependent in an unexpected manner and is faster than would be expected from Knudsen diffusion. This result suggests that non-Knudsen mechanisms contribute to the high permeability and permselectivity of the porous ceramic membranes for gaseous mixtures. Therefore, by taking advantage of non-Knudsen transport mechanisms in a porous ceramic membrane formed from a nanoparticulate sol and having a mean pore diameter of less than 40 Å, the method of the present invention offers advantageous benefits for fractionating gaseous mixtures.

Figure 2:
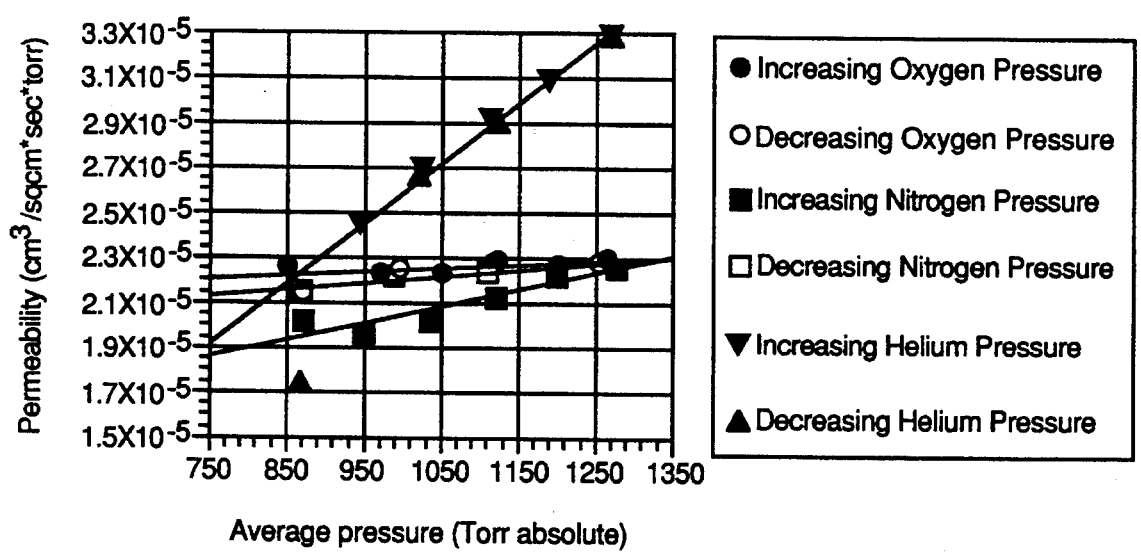
FIG. 2 plots the permeability of a small pore titania membrane to three gases at various pressures.

Unexpectedly, this method provides a process for efficient fractionation of relatively inert gases such as nitrogen, helium and oxygen, which are difficult to fractionate using existing membranes. Because these gases are inert, one would not have predicted that they would exhibit non-Knudsen surface activity in a porous ceramic membrane. Yet, as shown in FIG. 2, such surface activity is apparent from the pressure dependence of the gas permeability.

Helium, in particular, shows dramatically increasing permeability with increasing pressure. The effect of pressure on the permeabilities of nitrogen and oxygen is less pronounced, but is visible.

Figure 3:
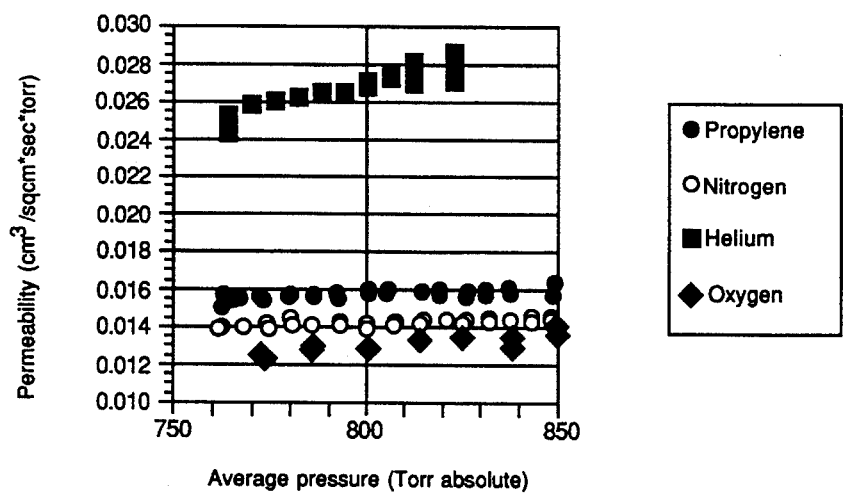
FIG. 3 plots the permeability to three gases of an anodized alumina support used herein to support small pore titania membranes versus pressure.

For comparison, FIG. 3 demonstrates the slight pressure dependence of the permeability of a porous support material formed of anodized aluminum. The pores in the support material used were approximately 0.02μ in diameter, near the 0.1μ transition between pressure-dependent viscous flow and pressure-independent Knudsen diffusion transport mechanisms. The slight pressure dependence reaffirms that these two mechanisms probably combine to transport these gases across the support.

Figure 4:
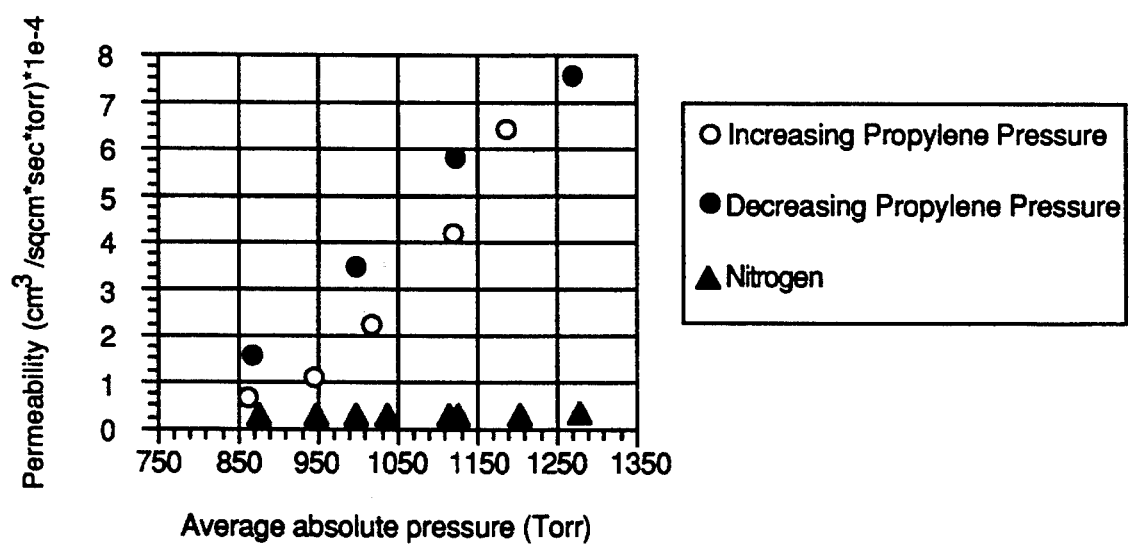
FIG. 4 plots the permeability of a titania membrane to propylene and nitrogen versus pressure.

FIG. 4 shows that, the supported membrane is markedly and unexpectedly more permeable to a large organic gas, propylene, than to nitrogen, a smaller species. Furthermore, the permeability is pressure dependent, and is therefore achieved by a non-Knudsen transport mechanism. It is believed that the ability of certain gases, such as propylene, to condense more readily at lower pressures in small pores makes such gases more available for non-Knudsen transport through the membrane. Thus, some form of condensation may be responsible for preferentially depositing gases in the membrane; the onset of condensation will take place at lower pressures in the smaller pores of the membranes and when coupled with a non-Knudsen transport mechanism will lead to higher permeabilities at significantly lower pressures. It is shown that delivery of condensible gases at pressures lower than ½ of the vapor pressure of the most condensable and surface-active gas in a mixture are sufficient to generate maximal permeability differences far greater than those generated using existing standards.

The invention is further clarified by consideration of the following examples which are intended to be purely exemplary of the method of the present invention.

EXAMPLES

Supported Particulate TiO₂ Membranes

First, a supply of the precursor titanium tetra-2-methyl-2-butoxide was prepared from commercially available materials. Titanium iso-propoxide, tertiary amyl alcohol, and benzene were all obtained from Aldrich Chemical Company. All chemicals were chemically pure grade or better, and all were used without further purification. Oxygen, helium, and nitrogen were obtained from Liquid Carbonic. Propylene was obtained from US Air Gas, Inc. All gases were 99.9% pure.

As is shown in Equation 3, titanium tetraisopropoxide was converted by an alcohol exchange reaction to titanium tetra-2-methyl-2-butoxide. This reaction was conducted by the method described by Bradley, et al., *J. Chem. Soc.*, 2027 (1952). The titanium tetra-isopropoxide was reacted with tert-amyl alcohol (t-AmOH) in a benzene solvent to yield titanium tetra-2-methyl-2-butoxide and isopropanol (i-PrOH). The isopropanol was then removed from the solution by distillation with benzene as an azeotrope at 71.4° C. The removal of the isopropanol was believed necessary to complete the formation of the tetra-2-methyl-2-butoxide. Excess t-AmOH and benzene were then removed via additional distillation at above 100° C. The NMR spectrum of the resulting light yellow product was taken to confirm that no isopropanol remained. There may have been trace amounts of t-AmOH in the product.

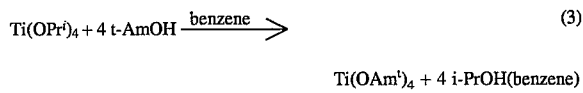

$$Ti(OPr^i)_4 + 4\ t\text{-AmOH} \xrightarrow{\text{benzene}} Ti(OAm^t)_4 + 4\ i\text{-PrOH(benzene)} \quad (3)$$

The preparation of the sol was begun by dissolving the titanium isopropoxide and acidified water in equal amounts of alcohol. The water had been previously acidified to a pH of 2. The desired concentration of the titanium in the solution and the molar ratio of water to titanium in the solution were calculated in advance. Based on a calculation of a molar level of 0.05 M of titanium and a molar ratio of water to titanium of 4 to 1, 2.33 grams of Ti(OAm$^t$)$_4$ were dissolved in 50 ml of AmOH while 180 μl of H₂O were introduced into 50 ml of AmOH as well. The water fraction was then introduced into the titanium alkoxide fraction by dripping while stirring. The dripping occurred over a fifteen minute time interval at room temperature. While the resulting solution appeared visibly transparent, light scattering measurements indicated small particles (having a diameter less than 5 nm) in suspension. The solution, which was 0.05 M titanium tetra-2-methyl-2-butoxide and 0.1 M H₂O, was stirred during an aging time of an additional two hours, also at room temperature.

Alpha alumina supports (0.02μ Anotec Anodisc, Anotec Separations) were rinsed in an acid solution (1 ml concentrated nitric acid: 100 ml H₂O) for 30 minutes and rinsed in water for 30 minutes. The acid-treated Anodisc was dried in an 80° C. oven overnight then soaked in a 0.05 M ammonium phosphate solution for 30 minutes. Again the disc was dried overnight in an 80° C. oven. The next day, the support disc was soaked in tert-amyl alcohol for 15 minutes. Excess alcohol was shaken from the disc and the disc was immersed in the 0.05 M titanium sol for 20 seconds. The excess sol was allowed to drip from the support and the coated disc was then dried under ambient conditions for 2 hours. The alcohol and sol immersions were repeated four more times at which point the coated support was dried at 80° C. overnight.

The next day, one additional alcohol immersion and one additional sol immersion were performed. The coated disc was fired to between 200° C. and 300° C. at a ramp rate of 1° C. per minute with a dwell time of 1 hour at the maximum firing temperature.

Permeability of the Membrane to Gases

The supported membrane, on a stainless steel undersupport, was placed into an apparatus like that shown schematically in FIG. 1. Various gases were delivered toward the membrane from the inlet side at average absolute pressures in the range of about 750–1300 Torr.

When propylene and nitrogen gases were separately delivered to the membrane, FIG. 4, it was observed that the permeability of propylene, but not that of nitrogen, was very strongly dependent upon the pressure. However, nitrogen also exhibited some pressure dependence. Furthermore, the permeability data demonstrate that propylene exhibits hysteresis, in that the permeability measured as the pressure increased was not the same as that measured when the pressure decreased. This would not be observed if Knudsen diffusion alone were responsible for transmembrane transport.

Figure 5:
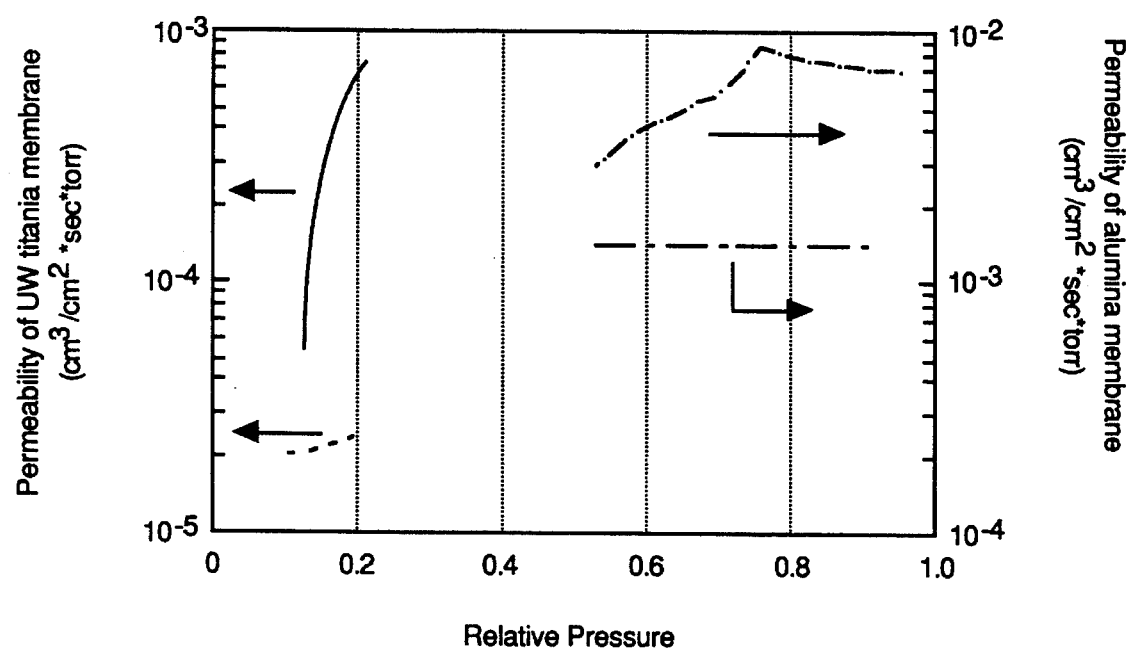
FIG. 5 compares the permeability of small pore titania and larger pore alumina membranes to propylene and nitrogen.

In addition, the permeabilities of the membranes to propylene and to nitrogen differ markedly and the maximal permeability difference ratio is greater for the titania membrane than it is for an alumina membrane of the prior art as shown in FIG. 5. The alumina membranes were roughly 7 times more permeable to propylene ( . • . • . ) than to nitrogen ( . — . — . ). In contrast, the titania membranes were maximally about 32 times more permeable to propylene ( . . . . . . . ) than to nitrogen ( . . . . . ). While the applicants do not wish to be limited to particular explanations for the observed results, it is believed that the bulk of the differences are due to differences in surface chemistry or to differences in mean pore diameters between the alumina and titania membranes, or to some combination of the two.

It was also observed, as shown in FIG. 5, that large increases in permeability to propylene but not to nitrogen began at much lower pressures for the small-pore titania membranes than for alumina membranes having mean pore diameters of approximately 40 Å. To demonstrate this advantageous phenomenon, propylene and nitrogen were passed toward the membrane at increasing pressures which were measured relative to the vapor pressure of propylene, the more permeable of the two gases used. Whereas large differences between propylene and nitrogen permeability were seen in the existing alumina membranes only at pressures above ½ of the propylene vapor pressure, the membranes used in the present method permitted separation at lower pressures, even as low as about ⅕ of the vapor pressure of propylene. The vapor pressure, Po, of propylene (in mm Hg) was calculated from the following correlation:

$$log_{10}P_o = 6.8196 - [785/(247+T)] \quad (4)$$

where T is the temperature of the gases, in degrees Kelvin.

In a separate set of experiments, shown in FIG. 2, the permeabilities of the membrane to nitrogen, oxygen, and helium gases were compared at average absolute pressures in the range of 850–1300 Torr. To some extent, the permeability of the membrane to each gas increased with increasing pressure. Moreover, both helium and nitrogen exhibited measurable hysteresis effects when the applied pressure was varied. These results are in sharp contrast to those obtained in previous studies using ceramic membranes. Furthermore, the membrane was more permeable to oxygen than to nitrogen over the pressure range investigated. These results are incompatible with a Knudsen-type diffusion mechanism operating alone, since Knudsen diffusivity is pressure independent.

In summary then, the membranes described herein are advantageously used in a method for fractionating a mixture of gases. The advantageous use is believed to stem from the very small mean pore diameter of the membranes which contribute to enhanced capillary condensation and to transport through the membrane by non-Knudsen mechanisms.

While it is not yet possible to predict which gas in a mixture will be most surface-active in a porous ceramic membrane in this method, the results presented demonstrate that when using this method fractionation of gases can be achieved, without undue experimentation, since the activity of each gas appears to be unique.

We claim:

1. A method for using a porous ceramic membrane to fractionate individual gases from a mixture of gases, the mixture comprising molecules of a gas having a larger average molecular radius and molecules of a gas having a smaller average molecular radius, the method comprising the steps of:

providing a porous ceramic membrane comprising a metal oxide other than silica or alumina, the membrane having a mean pore diameter of less than about 40 Å;

passing the mixture of gases by the membrane at an average input pressure lower than one-half of the vapor pressure of the gas having the larger average molecular radius;

adsorbing preferentially the gas molecules having the larger average molecular radius within the membrane pores, thereby initiating non-Knudsen transport of the gas molecules having the larger average molecular radius in the pores; and recovering a permeate stream enriched for gas molecules having the larger average molecular radius.

2. A method for using a porous ceramic membrane to fractionate individual gases from a mixture of gases as claimed in claim 1 wherein the membrane has a mean pore diameter of between about 5 and 20 Å.

3. A method for using a porous ceramic membrane to fractionate individual gases from a mixture of gases as claimed in claim 2 wherein the membrane has a mean pore diameter of about 15 Å.

4. A method for using a porous ceramic membrane to fractionate individual gases from a mixture of gases as claimed in claim 1 wherein the input pressure is less than about one-fifth of the vapor pressure of the gas molecules having the larger average molecular radius.

5. A method for using a porous ceramic membrane to fractionate individual gases from a mixture of gases as claimed in claim 4 wherein the mixture of gases comprises nitrogen and propylene.

6. A method for using a porous ceramic membrane to fractionate individual gases from a mixture of gases as claimed in claim 1 wherein the mixture of gases comprises nitrogen, helium, and oxygen.

7. A method for using a porous ceramic membrane to fractionate individual gases from a mixture of gases as claimed in claim 1 wherein the membrane is a supported membrane.

8. A method for using a porous ceramic membrane to fractionate individual gases from a mixture of gases as claimed in claim 7 wherein the support is provided by an anodized alumina substrate.

9. A method for using a porous ceramic membrane to fractionate individual gases from a mixture of gases as claimed in claim 7 wherein the membrane is flaw-free.

10. A method for using a porous ceramic membrane to fractionate individual gases from a mixture of gases as claimed in claim 1 wherein the membrane comprises titania.

11. A method for using a porous ceramic titania membrane to fractionate individual gases from a mixture of gases, the mixture comprising molecules of a gas having a larger average molecular radius and molecules of a gas having a smaller average molecular radius, the method comprising the steps of:

providing a porous ceramic titania membrane having a mean pore diameter of less than about 40 Å;

passing the mixture of gases by the membrane at an average input pressure lower than one-half of the vapor pressure of the gas having the larger average molecular radius;

adsorbing preferentially the gas molecules having the larger average molecular radius within the membrane pores, thereby initiating non-Knudsen transport of the gas molecules having the larger average molecular radius in the pores; and recovering a permeate stream enriched for gas molecules having the larger average molecular radius.

12. A method for using a porous ceramic titania membrane to fractionate individual gases from a mixture of gases as claimed in claim 11 wherein the membrane has a mean pore diameter of between about 5 and 20 Å.

13. A method for using a porous ceramic titania membrane to fractionate individual gases from a mixture of gases as claimed in claim 12 wherein the membrane has a mean pore diameter of about 15 Å.

14. A method for using a porous ceramic titania membrane to fractionate individual gases from a mixture of gases as claimed in claim 11 wherein the input pressure is less than about one-fifth of the vapor pressure of the gas molecules having the larger average molecular radius.

15. A method for using a porous ceramic titania membrane to fractionate individual gases from a mixture of gases as claimed in claim 14 wherein the mixture of gases comprises nitrogen and propylene.

16. A method for using a porous ceramic titania membrane to fractionate individual gases from a mixture of gases as claimed in claim 11 wherein the mixture of gases comprises nitrogen, helium, and oxygen.

17. A method for using a porous ceramic titania membrane to fractionate individual gases from a mixture of gases as claimed in claim 11 wherein the membrane is a supported membrane.

18. A method for using a porous ceramic titania membrane to fractionate individual gases from a mixture of gases as claimed in claim 17 wherein the support is provided by an anodized alumina substrate.

19. A method for using a porous ceramic titania membrane to fractionate individual gases from a mixture of gases as claimed in claim 17 wherein the membrane is flaw-free.

* * * * *